3,655,880
ANTIBIOTIC SL 3238 AND PROCESS FOR THE PRODUCTION OF SAME
Pietro Bollinger, Binningen, Eugen Harri, Therwil, and Hans-Peter Sigg, Binningen, Switzerland, assignors to Sandoz Ltd. (also known as Sandoz AG), Basel, Switzerland
Filed Feb. 5, 1970, Ser. No. 8,950
Claims priority, application Switzerland, Feb. 12, 1969, 2,086/69
Int. Cl. A61k 21/00
U.S. Cl. 424—122      3 Claims

ABSTRACT OF THE DISCLOSURE

The invention concerns a novel antibiotic SL 3238, which can be produced from a strain of the fungus species *Penicillium purpurogenum* Stoll, NRRL 3364.

Figure 1:
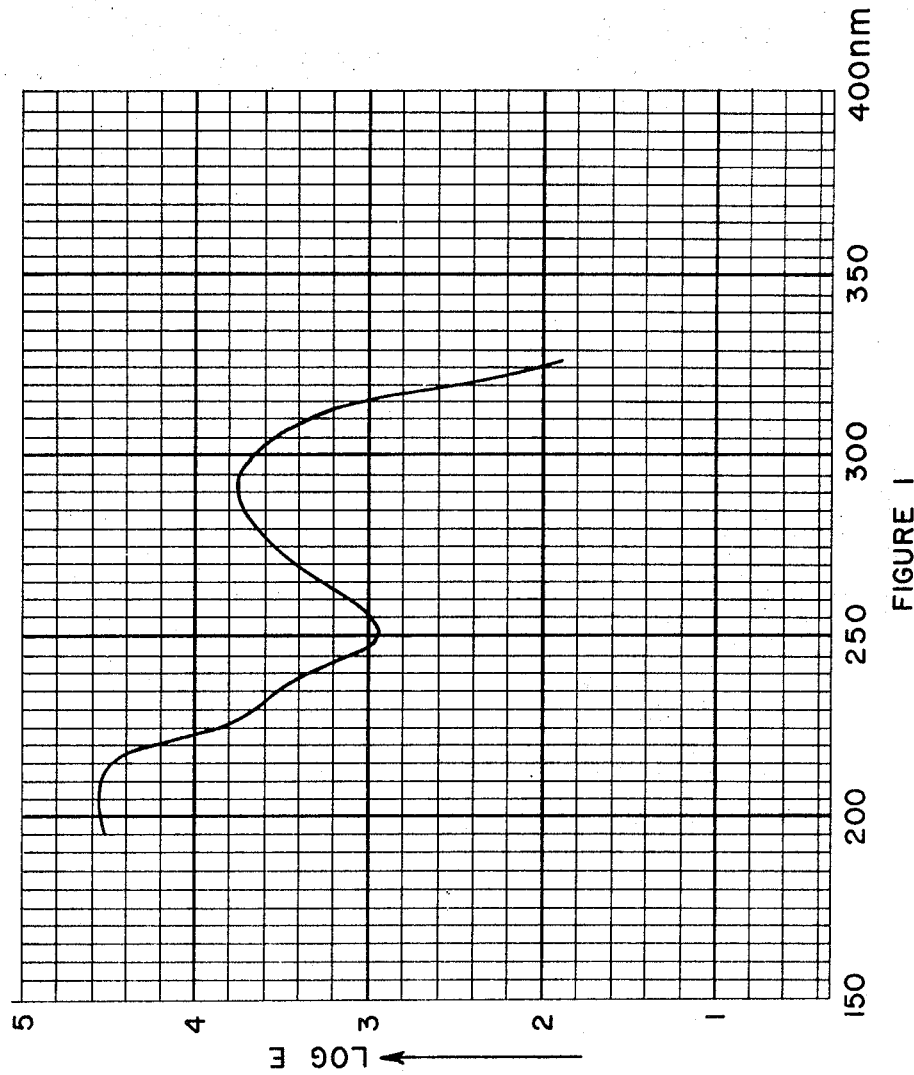

The antibiotic possesses a high fungistatic effect and also exhibits a systemic effect against dermatophytes.

IMPROVEMENTS IN OR RELATING TO ORGANIC COMPOUNDS

The present invention relates to a new antibiotic, hereinafter called SL 3238, processes for the production of this antibiotic and pharmaceutical preparations thereof.

According to the invention, there is provided a process for the production of the antibiotic SL 3238, characterized in that a strain of the fungus species *Penicillium purpurogenum* Stoll, NRRL 3364, is cultivated in contact with a nutrient medium containing assimilable sources of carbon and nitrogen.

The new strain NRRL 3364 of *Penicillium purpurogenum* Stoll used in accordance with the invention was isolated from soil samples from Central Africa, and a specimen of said strain has been deposited with the U.S. Department of Agriculture (Northern Utilization Research and Development Division), Peoria, Ill., U.S.A., under the reference NRRL 3364, where it is freely available for examination.

The new strain of the fungus species *Penicillium purpurogenum* Stoll grows on a glucose/malt/yeast extract/peptone agar at 18 to 37° C. and forms a dark, yellowish green, furry coating of conidia and a small amount of light aerial mycelium. The under side of the colony shows a bright cherry red colouration of the substrate.

Morphologically and physiologically the strain S 3238 corresponds to the description in the manual of K. B. Raper and Ch. Thom, "A Manual of the Penicillia," The Williams and Wilkins Co., Baltimore, 1949, pp. 630 to 636.

The new strain of the fungus species *Penicillium purpurogenum* Stoll may be cultivated on various nutrient media containing the usual nutrients. For example, such strains make use of nutrients usually employed for carbon-heterotrophic organisms, for example glucose, starch, dextrin, lactose, cane sugar, etc. as the carbon source, organic and inorganic nitrogen-containing compounds, such as peptone, yeast or meat extracts, ammonium sulphate, ammonium nitrate, amino acids, etc. as the nitrogen source, as well as the usual mineral salts and trace elements.

The new antibiotic may be produced in such a manner that a liquid nutrient medium is inoculated with a suspension of spores of a new strain of *Penicilllium purpurogenum* Stoll and the culture is incubated at 27° for 5 to 10 days. The cultivation may be effected under aerobic conditions by static surface culture fermentation or by submerged culture fermentation with shaking, or in fermenters provided with devices for introducing air or oxygen and agitators. As soon as the maximum amount of antibiotic has been produced, the culture solution is filtered and the antibiotic is obtained from the mycelium-free culture solution and the previously mechanically destroyed mycelium in manner known per se by extractive or adsorptive methods.

One especially preferred method consists in the mechanical destruction of the mycelium which has been separated from the culture liquid and the joint extraction of an aqueous mycelium suspension and the mycelium-free culture solution with ethylene chloride, although other organic solvents, e.g. benzene, chloroform, butyl acetate, methylene chloride or butanol, may likewise be used. The new antibiotic may be isolated directly from the concentrated extract by precipitation.

Figure 2:
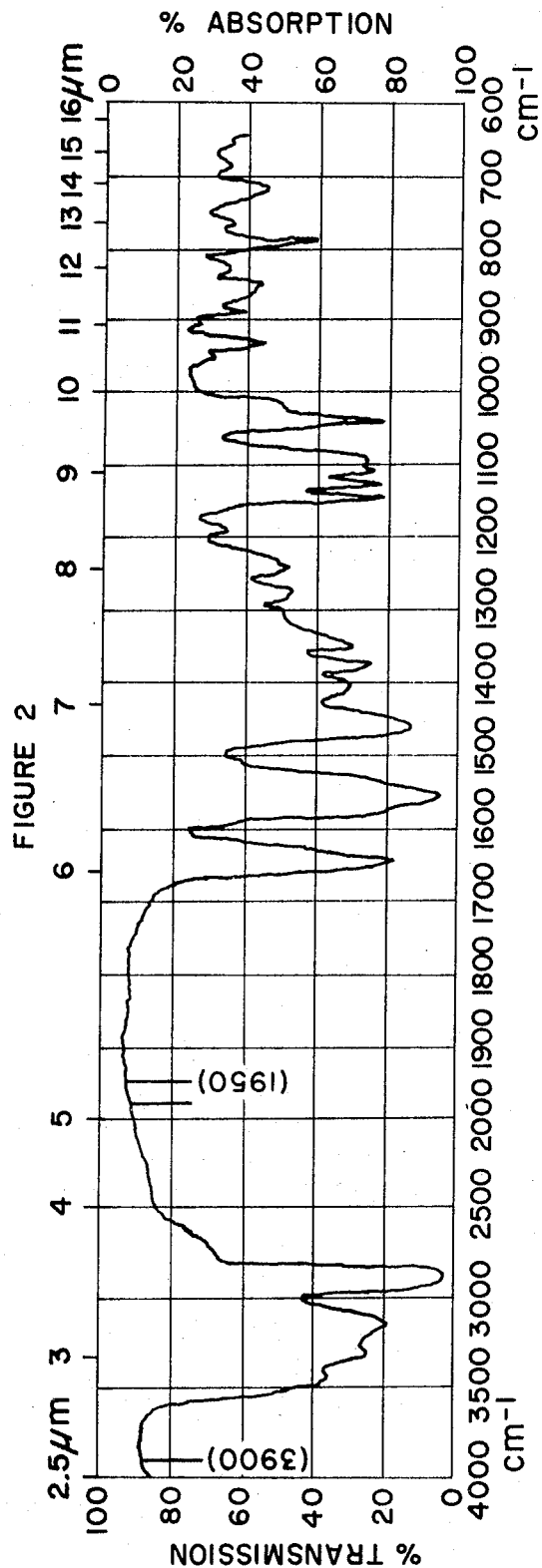

The new antibiotic SL 3238 may be characterized as follows:

Empirical formula: $C_{27}H_{41}NO_7$, molecular weight 492, melting point 160–161° C.
Specific rotation: $[\alpha]_D^{20} = -102°$ (c.=0.47 in chloroform)
Ultraviolet spectrum (methanol): $\lambda_{max}=203$ nm. (log $\epsilon=4.57$), 291 nm. (log $\epsilon=3.75$) (FIG. 1)
Infrared spectrum (Nujol): Bands at 3450, 3300, 3150, 2900, 2840, 1650, 1580, 1560, 1540, 1460, 1380, 1350, 1245, 1150, 1130, 1105, 1095, 1045, 940, 790 cm.$^{-1}$ (FIG. 2).

The antibiotic SL 3238 is a useful fungistatic, particularly as indicated by its activity in vitro against

*Candida albicans* (lowest inhibiting concentration 2 µ/ml.)
*Candida tropicalis* (lowest inhibiting concentration 4 µ/ml.)
*Trichophyton mentagrophytes* (lowest inhibiting concentration 1 µ/ml.)
*Histoplasma capsulatum* (lowest inhibiting concentration 10 µ/ml.)
*Aspergillus fumigatus* (lowest inhibiting concentration 40 µ/ml.)
*Trichophyton tonsurans* (lowest inhibiting concentration 2 µ/ml.)
*Trichophyton rubrum* (lowest inhibiting concentration 1 µ/ml.)
*Epidermophyton floccosum* (lowest inhibiting concentration 2 µ/ml.)
*Microsporum audouinni* (lowest inhibiting concentration 1 µ/ml.)
*Microsporum canis* (lowest inhibiting concentration 1 µ/ml.).

Powders, sprays, ointments or tinctures conveniently containing between about 0.1 and 2% of the antibiotic may be employed for topical application. The antibiotic furthermore exhibits a systemic effect against dermatophytes in vivo, e.g. in guinea pigs. For this use, the dose and mode of administration will of course vary depending on the desired effect, although satisfactory results can be obtained with p.o. daily doses between about 2 and 50 mg./kg. animal body weight, which may be administered in divided doses 2 to 3 times a day. For larger mammals, a satisfactory dose is between about 150 and 250 mg. of the antibiotic, in association with a pharmaceutically acceptable carrier or diluent. A suitable unit dosage form for oral administration contains between about 50 and 125 mg. of active ingredient.

The antibiotic SL 3238 produced in accordance with the invention may be used as medicament on its own, either in the form of an oil or as crude concentrate, or in the form of appropriate medicinal preparations for topical or oral administration. In order to produce suitable medicinal preparations the antibiotic is worked up with inorganic or organic, pharmacologically inert adjuvants. Examples of such adjuvants are:

for tablets and dragées: lactose, starch, talc, stearic acid, etc.

for syrups: solutions of cane sugar, invert sugar, glucose, etc.

for ointments: eulenin, glycerin, vaseline, paraffin oil inter alia

The preparations may furthermore contain suitable preserving, stabilizing and wetting agents, solubilizers, sweetening and colouring substances, flavouring, etc.

In the following non-limitative example all temperatures are indicated in degrees centigrade. The melting or decomposition points were determined on a Kofler block.

EXAMPLE 2,900 litres of a nutrient solution (of which each litre contains 40 g. of Cerelose
8.5 g. of $NaNO_3$
2.7 g. of $KH_2PO_4$
1.2 g. of $MgSO_4 \cdot 7H_2O$
28 mg. of $FeSO_4 \cdot 7H_2O$
3 mg. of $ZnSO_4 \cdot 7H_2O$ and demineralized water to make up to one litre) are inoculated in a fermenter with a preculture of the strain NRRL 3364 of *Penicillium purpurogenum* Stoll obtained as described hereinafter, and incubation is effected at 27° for 90 hours whilst stirring (100 revolutions per minute) and aerating (1.2 litres of air per minute per litre of nutrient solution). The culture liquid (2,600 litres, pH 5.6) is centrifuged. The mycelium (165 kg.) is crushed twice in an Ultra-Turrax apparatus with 210 litre amounts of methanol. After filtration and addition of 50 litres of water, the methanol is distilled off, the aqueous phase and the culture filtrate are jointly extracted with the same volume of ethylene chloride. The organic phase is concentrated to 5 litres in a vacuum and this concentrated extract is divided thrice between 4 litres of petroleum ether and 4 litres of methanol/water (9:1). The methanol/water phase is diluted with water and the methanol is subsequently evaporated in a vacuum. The remaining aqueous phase is extracted thrice with 10 litre amounts of chloroform and the chloroform solution is concentrated to 1.5 litres. Pure SL 3238 is precipitated from the concentrated chloroform solution by the addition of ether.

The preculture used above is obtained as follows:

The preculture is cultivated in two stages (50 litres and 300 litres) under conditions analogous to those of the main culture described above.

The spore suspension used for inoculation of the first (50 litre) stage is produced from a culture of the originally isolated strain, which is cultivated at 27° for 19 days on an agar medium having the following composition:

20 g. of Cerelose
20 g. of filamentous agar
2 g. of malt extract (Schweiz.Ferment AG)
2 g. of yeast extract
2 g. of peptone
2 g. of $KH_2PO_4$
2 g. of $MgSO_4 \cdot 7H_2O$ and demineralized water to make up one litre.

What is claimed is:

1. The antibiotic SL 3238 having the empirical formula $C_{27}H_{41}NO_7$, a melting point of 160° to 161° C., characteristic ultraviolet spectrum as shown in FIG. 1 and characteristic infrared spectrum bands at 3450, 3300, 3150, 2900, 2840, 1650, 1580, 1560, 1540, 1460, 1380, 1350, 1245, 1150, 1130, 1105, 1095, 1045, 940, 790 cm.$^{-1}$.

2. An anti-fungal antibiotic composition comprising as active ingredients 150 to 250 mg. of the antibiotic of claim 1, in association with a carrier or diluent.

3. A process for the production of the antibiotic SL 3238, comprising cultivating the fungus species *Penicillium purpurogenum* Stoll, NRRL 3364 in a nutrient medium containing assimilable sources of carbon and nitrogen until sufficient amount of anti-fungal activity of the antibiotic SL 3238 has been produced.

References Cited

Miller: The Pfizer Handbook of Microbial Metabolites, McGraw-Hill Book Co. Inc., N.Y., N.Y., 1961, pp. 152, 153 and 413.

JEROME D. GOLDBERG, Primary Examiner

U.S. Cl. X.R.

195—81